(12) United States Patent
Dalrymple

(10) Patent No.: US 8,027,070 B2
(45) Date of Patent: Sep. 27, 2011

(54) METHODS AND SYSTEMS FOR HUE ADJUSTMENT

(75) Inventor: John C. Dalrymple, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 419 days.

(21) Appl. No.: 12/365,133

(22) Filed: Feb. 3, 2009

(65) Prior Publication Data

US 2010/0195173 A1  Aug. 5, 2010

(51) Int. Cl.
*G03F 3/00* (2006.01)
*G09G 5/02* (2006.01)

(52) U.S. Cl. ........ 358/520; 358/518; 382/162; 382/167; 345/589; 345/591

(58) Field of Classification Search .......... 358/1.9, 358/518, 520; 382/162, 167; 345/589, 591
See application file for complete search history.

(56) References Cited

U.S. PATENT DOCUMENTS

| | | | |
|---|---|---|---|
| 4,941,038 A | 7/1990 | Walowit |
| 5,243,414 A | 9/1993 | Dalrymple et al. |
| 5,426,517 A | 6/1995 | Schwartz |
| 5,450,216 A | 9/1995 | Kasson |
| 5,491,568 A | 2/1996 | Wan et al. |
| 5,515,172 A | 5/1996 | Shiau |
| 5,633,662 A | 5/1997 | Allen |
| 5,731,818 A | 3/1998 | Wan et al. |
| 5,933,253 A | 8/1999 | Ito et al. |
| 5,933,256 A | 8/1999 | Ebner |
| 5,949,967 A | 9/1999 | Spaulding et al. |
| 5,953,499 A | 9/1999 | Narendranath |
| 5,975,679 A | 11/1999 | Nicoloff, Jr. |
| 6,002,806 A | 12/1999 | Morikawa |
| 6,084,689 A | 7/2000 | Mo |
| 6,229,915 B1 | 5/2001 | Ohkubo |
| 6,262,744 B1 | 7/2001 | Carrein |
| 6,282,311 B1 | 8/2001 | McCarthy et al. |
| 6,282,313 B1 | 8/2001 | McCarthy et al. |
| 6,342,951 B1 | 1/2002 | Eschbach et al. |
| 6,349,146 B2 | 2/2002 | Roetling |
| 6,373,595 B1 | 4/2002 | Semba et al. |
| 6,384,836 B1 | 5/2002 | Naylor, Jr. et al. |
| 6,407,825 B1 | 6/2002 | Couwenhoven |

(Continued)

FOREIGN PATENT DOCUMENTS

EP  0626781  11/1994

(Continued)

OTHER PUBLICATIONS

Development and Testing of a Color Space (IPT) with Improved Hue Uniformity by Fritz Ebner & Mark Fairchild, Rochester Institute of Technology, 1998.

(Continued)

*Primary Examiner* — Kimberly A Williams
(74) *Attorney, Agent, or Firm* — Chernoff, Vilhauer, McClung & Stenzel

(57) ABSTRACT

Aspects of the present invention relate to systems and methods for color image hue shifting. Some aspects relate to processes by which reference hue values and corresponding hue shift values are used to modify color hue values in a non-perceptually-uniform color space. Some aspects relate to processes that generate a hue shift table for modifying image hue values.

20 Claims, 12 Drawing Sheets

| Hue shift specifications table index | Input hue angle (H) | Shifted hue angle (H') | Comment |
|---|---|---|---|
| 1 | 60 | 55 | Shift yellows to less greenish |
| 2 | 120 | 130 | Shift greens to less yellowish |
| 3 | 240 | 225 | Shift blues to less reddish |

U.S. PATENT DOCUMENTS

| | | |
|---|---|---|
| 6,547,358 B1 | 4/2003 | Tanaka |
| 6,560,356 B1 | 5/2003 | Takahashi et al. |
| 7,190,485 B2 | 3/2007 | Couwenhoven |
| 7,800,781 B2 * | 9/2010 | Watanabe et al. ............... 358/1.9 |
| 2001/0040998 A1 | 11/2001 | Roetling |
| 2002/0041709 A1 | 4/2002 | Gonsalves |
| 2003/0001851 A1 | 1/2003 | Bushey |
| 2003/0012427 A1 | 1/2003 | Martinez-Uriegas et al. |
| 2003/0067615 A1 | 4/2003 | Kawakami et al. |
| 2003/0072016 A1 | 4/2003 | Dalrymple et al. |
| 2003/0117457 A1 | 6/2003 | Qiao |
| 2003/0160801 A1 | 8/2003 | Butler |
| 2005/0030559 A1 | 2/2005 | Jacob |
| 2005/0073730 A1 | 4/2005 | Huang et al. |
| 2005/0219574 A1 | 10/2005 | Ok |
| 2005/0248581 A1 | 11/2005 | Choe |
| 2005/0248784 A1 | 11/2005 | Henley et al. |
| 2006/0012811 A1 | 1/2006 | Dalrymple |
| 2007/0070468 A1 | 3/2007 | Ogawa |
| 2007/0195340 A1 | 8/2007 | Yao |
| 2007/0195341 A1 | 8/2007 | Yao |
| 2007/0247647 A1 | 10/2007 | Pettigrew |
| 2007/0273738 A1 * | 11/2007 | Tsuchiya ...................... 347/100 |
| 2007/0296986 A1 * | 12/2007 | Watanabe et al. ............. 358/1.9 |
| 2008/0079968 A1 * | 4/2008 | Ho et al. ....................... 358/1.9 |
| 2009/0052773 A1 * | 2/2009 | Oohara ......................... 382/167 |
| 2009/0079755 A1 * | 3/2009 | Clock ........................... 345/589 |

FOREIGN PATENT DOCUMENTS

| | | |
|---|---|---|
| EP | 635971 | 1/1995 |
| EP | 720352 | 7/1996 |
| EP | 730969 | 9/1996 |
| EP | 887999 | 12/1998 |
| EP | 1289268 | 3/2003 |
| EP | 1267565 | 11/2003 |
| EP | 1533994 | 5/2005 |
| EP | 1770984 | 4/2007 |
| EP | 1781014 | 5/2007 |
| JP | 2000253264 | 9/2000 |
| JP | 2005035012 | 2/2005 |
| WO | WO96/10239 | 4/1996 |
| WO | WO97/01831 | 1/1997 |
| WO | WO99/46125 | 12/1999 |
| WO | WO01/17233 | 3/2001 |
| WO | WO2005043507 | 5/2005 |

OTHER PUBLICATIONS

Macdonald, Assessing the Effects of Gamut Compression in the Reproduction of Fine Art Paintings, Proc of the IS&T/SID 1995 Color Imaging Conference: Color Science, Systems and Applications, pp. 194-199.

U.S. Appl. No. 11/053,370—Office Action dated Apr. 24, 2008.
U.S. Appl. No. 11/053,370—Office Action dated Dec. 12, 2008.

* cited by examiner

| Hue shift specifications table index | Input hue angle (H) | Shifted hue angle (H') | Comment |
|---|---|---|---|
| 1 | 60 | 55 | Shift yellows to less greenish |
| 2 | 120 | 130 | Shift greens to less yellowish |
| 3 | 240 | 225 | Shift blues to less reddish |

METHODS AND SYSTEMS FOR HUE ADJUSTMENT

FIELD OF THE INVENTION

Embodiments of the present invention comprise methods and systems for color image hue adjustment.

BACKGROUND

Images can be generated by many methods and may be displayed or output as hard copy using a plethora of devices. In some cases, image hues may need to be adjusted to compensate for differences in display or output device characteristics. These adjustments may be based on a user preference and/or colorimetric standards and parameters.

SUMMARY

Some embodiments of the present invention comprise methods and systems for color image hue adjustment. Some embodiments comprise methods and systems for generation of a hue adjustment or hue shift lookup table, map or data structure that can be used to adjust image hue values. Some embodiments comprise methods and systems for hue adjustment performed in a non-perceptually-uniform color space.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figures 1, 2:
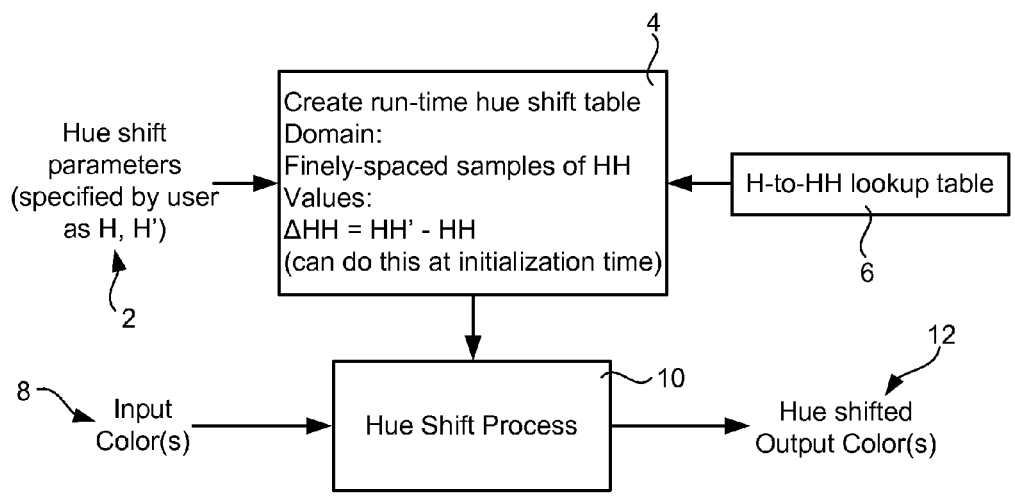
FIG. 1 is a diagram of a table showing exemplary hue shift parameters.
FIG. 2 is a diagram showing an exemplary hue shift process.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise design of hue mapping for a color-rendering transform, which may be a component of a color processing flow, such as one inside a tool for generating profiles compatible with an International Color Consortium (ICC) ICC.1 specification, or a stage in an image processing flow, such as one for printing color documents. In an exemplary method, a designer may specify hue mappings as lists of H to H' pairs, where H and H' denote hue angles in a hue-saturation-value (HSV) space for a reference hue value and a shifted hue value, respectively.

In some embodiments of the present invention, HSV coordinates may be calculated from RGB coordinates in a gamma-corrected, radiometrically linear space. Such a space may also be referred to in the art as a linear-light space. Since radiometric quantities translate to visual percepts in a strongly nonlinear manner, color-reproduction practitioners readily understand that such an RGB space cannot be perceptually uniform. In addition, HSV is merely a relabeling of an RGB space in terms of 'perceptual-like' dimensions, conceptually similar to a rectangular-to-polar conversion. Such relabeling does nothing to impart perceptual uniformity to an inherently perceptually-non-uniform space.

In some embodiments, rendering transforms such as hue shifts may be applied within an 'offline' color processing system that generates a multidimensional color lookup table or color profile, such as an International Color Consortium (ICC) specification-compliant profile.

As is well known in the art, an image processing system can later use such generated lookup tables or profiles and interpolation techniques to convert image or document colors 'online,' e.g., when converting image or document colors to device signals or colorant mixture amounts for output on an imaging device such as a display or printer.

In some embodiments of the present invention, a user may specify desired hue mappings in a perceptually-non-uniform space, and, at the stage of color processing where hue mapping is actually applied to image or document colors, these mappings may be applied to the hue coordinates of colors in an HSV space based on a linear-light RGB space, i.e., a perceptually-non-uniform space. In these embodiments, neither the designation nor the application of the hue shift is carried out in a perceptually-uniform space.

Some embodiments of the present invention may use an RGB space having sRGB primaries as specified in International Telecommunications Union Radiocommunications Recommendation ITU-R BT709 and a gamma value of 1 (signifying an optoelectronic transfer function that is mathematically linear) as the basis of its HSV-based hue mapping method. In other embodiments, different linear-light spaces may be used.

In some embodiments of the present invention, a user (e.g., a color reproduction practitioner) designs a hue mapping in a non-perceptually-uniform space—e.g., HSV based on linear-light RGB signals of a monitor color space such as gamma-corrected sRGB.

In an exemplary embodiment, during color rendering, image color hues are mapped via simple addition of hue offsets defined as HSV hue angles associated with linear-light RGB signals. At rendering time, the hue offsets may be retrieved from a finely-sampled 1D LUT, or some other data structure, that is pre-generated during an initialization phase, and indexed based on the hue of the image color. The LUT's sampling may be made fine enough that direct lookup can be used. In these embodiments, no weighting functions or interpolations are required at the time of image processing. The terms run time, color rendering time and processing time may refer to a time when color coordinates are processed by embodiments of the present invention. For example, colors of objects such as text, curves or filled regions, as might be described in a page description language, may be directly processed. As another example, colors of pixels in a digital image may be directly processed. As yet another example, colors associated with indices into or locations in a color look-up table being generated may be processed, wherein the generated look-up table is then later applied to other color coordinates.

Some embodiments of the present invention may comprise an interactive software application that runs on a general-purpose or dedicated-purpose computer. An exemplary embodiment runs on Microsoft Windows XP. However, other embodiments employ other general-purpose computing environments such as Linux, Unix, Macintosh, etc, as well as dedicated computers and processors.

The hue mapping component of embodiments of the present invention may be embodied as software code. In an exemplary embodiment, this code may be written in the Matlab language. These methods may also be applied 'online' during processing of image or document color data within software, embedded firmware, or dedicated hardware such as an ASIC.

Exemplary embodiments of the present invention comprise shifting the hue of given colors, typically as a component of a color processing application, system, or workflow. These embodiments may utilize parameters such as:

1. A list of reference hue angles, H, specified in an HSV space derived from a linear-light reference RGB space (e.g., an RGB space based on ITU-R BT709/sRGB primaries and having a gamma of 1, signifying an optoelectronic transfer function that is mathematically linear).
2. A list of corresponding shifted hue angles, H', denoted in the same HSV space.

Semantic interpretation of parameters: H and H' values correspond to visually perceived hues of colors related to a set of maximally saturated colors of the reference RGB cube. In some embodiments, these colors may be slightly de-saturated by having a small amount of achromatic color mixed in. Note that mixing in achromatic color (having the same chromaticity as the white point of the RGB cube) does not disturb the H coordinate of HSV. This de-saturation process may be referred to as Adjustment 1.

In an exemplary scenario, a printer's pure yellow may be visually perceived as slightly 'warmer' (more reddish) than a pure BT709/sRGB yellow. When there is a color reproduction objective to output pure printer yellow when an image color is pure sRGB yellow, it is useful to shift the hues of image colors in the yellow region a little toward red. In an exemplary embodiment, described with reference to FIG. 1, the input hue angle (H) column of the table in FIG. 1 needs an entry at H=60 degrees (which corresponds to sRGB/BT709 yellow). For the value in the H column equal to 60 degrees, a corresponding H' value in the H' column is a number less than 60 degrees (e.g., 55 for a hypothetical printer and paper of interest). The appropriate H' value depends on the visual hue of the printer's yellow colorant when deposited on a substrate of interest and viewed in a viewing condition of interest. Such an H' can be found via a manual search procedure, by iteratively setting a trial H' value in a rendering control within an ICC profile generation tool in accordance with the present invention, generating a printer profile incorporating a hue shift corresponding to the trial value of H' at H 60 degrees, using an ICC-based color management system (such as is provided in Adobe Photoshop) to convert a pure yellow sRGB image to printer CMYK, and observing (e.g., in Adobe Photoshop's Info window) the resulting CMYK mixture. The goal of the manual search is to establish an H' that results in cyan and magenta colorant amounts both equal to zero in the resulting CMYK mixture.

Some embodiments of the present invention may be described as being divided into phases: (1) an initialization phase, where parameter settings are received and data structures are prepared in a suitable form for (2) a main color processing phase, during which color lists, image pixels etc. are transformed, yielding colors with hues shifted according to the parameter settings.

In an exemplary embodiment described below, input and output colors of phase (2) processing may be denoted in a D65-referenced CIELAB space.

In this exemplary embodiment, source and destination hue angles may be specified by a user with reference to an HSV color space that is based on a linear-light reference RGB space. Destination angles are those to which source angles will be shifted during a processing phase.

This exemplary embodiment may comprise an initialization phase in which a one-dimensional hue-shift lookup table is built. This phase may comprise the following steps:

1. HSV colors at the given source and destination hue angles H and H' are constructed by combining angles H and H' with constant saturation coordinate S=1 and constant value coordinate V=1. The resulting colors are in the set of maximally saturated colors of the linear-light reference RGB space.
2. Adjustment 1 may be applied if desired or if necessary. Adjustment 1 may comprise linearly blending in a small amount of an achromatic color having the chromaticity of the white point of the linear-light reference RGB space.

The results are converted to a perceptual color space (e.g., color space 4 as mentioned below), which has good visual hue constancy. For example, some embodiments use ICh, the cylindrical form of IPT, described in F. Ebner and M. D. Fairchild, "*Development and Testing of a Color Space (IPT) with Improved Hue Uniformity*", Proceedings of the 6th IS&T/SID Color Imaging Conference, Scottsdale: 8-13 (1998), which is hereby incorporated herein by reference.

3. In the ICh space, the (lower-case) 'h' coordinate represents a visually perceived hue angle, the 'I' coordinate represents a perceived lightness and the 'C' coordinate represents a perceived chroma.

4. I and C coordinates of the results in color space 4 are discarded and replaced by fixed values.
5. The results are converted to color space 5, which may have dimensions similar to those of space 1 (HSV based on the same linear-light RGB space). In color space 5, HSV hue coordinates are denoted as modified hue components HH and shifted HSV hue coordinates are denoted as modified hue components HH' to distinguish these from the H and H' components of color space 1.
6. Interpolation may be applied at a densely and uniformly spaced range of HH values, based on functions of the source and destination hues as represented by hue angle coordinates in color space 5, resulting in a one-dimensional lookup table (1D LUT) which may be referred to as a hue shift lookup table. For example, values of an angular shift ΔHH=HH'−HH may be interpolated over samples of HH and stored in the hue shift lookup table.

During a processing phase, an input color to be processed may be specified in color space 2 (e.g., D65 CIELAB).

1. The input color is converted to color space 1 (HSV based on linear-light reference RGB).
2. Adjustment 1 is applied to the result, if Adjustment 1 was performed in the initialization phase.
3. The result is converted to color space 4 and saved as V1.
4. The I and C components in color space 4 are replaced by the same fixed values used during initialization.
5. The resulting color is converted to color space 5 (HSV).
6. Saturation and value components of the color in color space 5 are ignored. A 1D LUT index is derived from the hue component (HH) and the ΔHH angular shift value stored at the 1D LUT address corresponding to the derived index is retrieved. The hue shift is accomplished by adding the ΔHH to the HH component of the color in color space 5.
7. The result is converted back to color space 4 (e.g., ICh) and the shifted h component is substituted in place of the h component of V1, yielding V2.
8. If Adjustment 1 was applied for mathematical reasons, e.g., to provide monotonic relationships among pairs of H, h, and HH for the chosen hue-constant perceptual space, then V2 may be converted to the color space in which Adjustment 1 was applied, and the inverse of Adjustment 1 may be applied.
9. The result is converted to a desired output space. In an exemplary embodiment, the output space is color space 2 (D65 CIELAB) and the L* component of the result is replaced by the L* component of the input color in color space 2.

In additional exemplary embodiments, similarly to those described above, a user may desire, for aesthetic reasons or otherwise, to shift colors as described in the comment column of FIG. 1. If so, the user may specify hue shift parameters by identifying one or more input hue angles (H) and corresponding shifted hue angles (H'). In FIG. 1, 0 degrees represents the HSV hue angle (H) of the pure red primary of the reference linear-light RGB space. Similarly, 60 degrees would represent pure yellow (pure red plus pure green), 120 degrees green, 180 degrees cyan, 240 degrees blue, and 300 degrees magenta. Output angles represent shifted hue angles (H') in the same space. These hue shift parameters may be used to construct a hue shift lookup table that correlates a range of possible input hue angles with corresponding shifted angles or angular shifts.

FIG. 2 is a block diagram representing aspects of some embodiments of the present invention. In these embodiments, a user specifies 2 hue shift parameters, as described above, which are input to a hue shift lookup table creation process 4.

The table creation process may create a table that correlates a modified hue angle, HH, with a modified hue angular shift ΔHH. The table may also or alternatively correlate a modified hue angle, HH, with a shifted, modified hue angle HH'.

The hue shift lookup table creation process 4 may also access a hue scale conversion lookup table 6 that has been created previously. Hue scale conversion lookup table 6 may encode a bijective mapping between HSV hue angles H and corresponding modified hue angles HH. Some embodiments of the present invention may employ the hue scale conversion table to create a hue shift lookup table at the time of image rendering. Other embodiments may employ the hue scale conversion table to create a hue shift lookup table as part of a process related to generating a color profile, which in turn may be used to process image color values at some other time. At image rendering time or at color profile generation time, after hue shift parameters have been specified and after the hue shift lookup table has been generated, image color data 8 is input to the hue shift process 10, which may access a previously-constructed hue shift lookup table to determine a hue shift that is appropriate for each color. The result of the hue shift process is one or more shifted output colors 12. Details of exemplary processes are explained below.

Figure 3A:
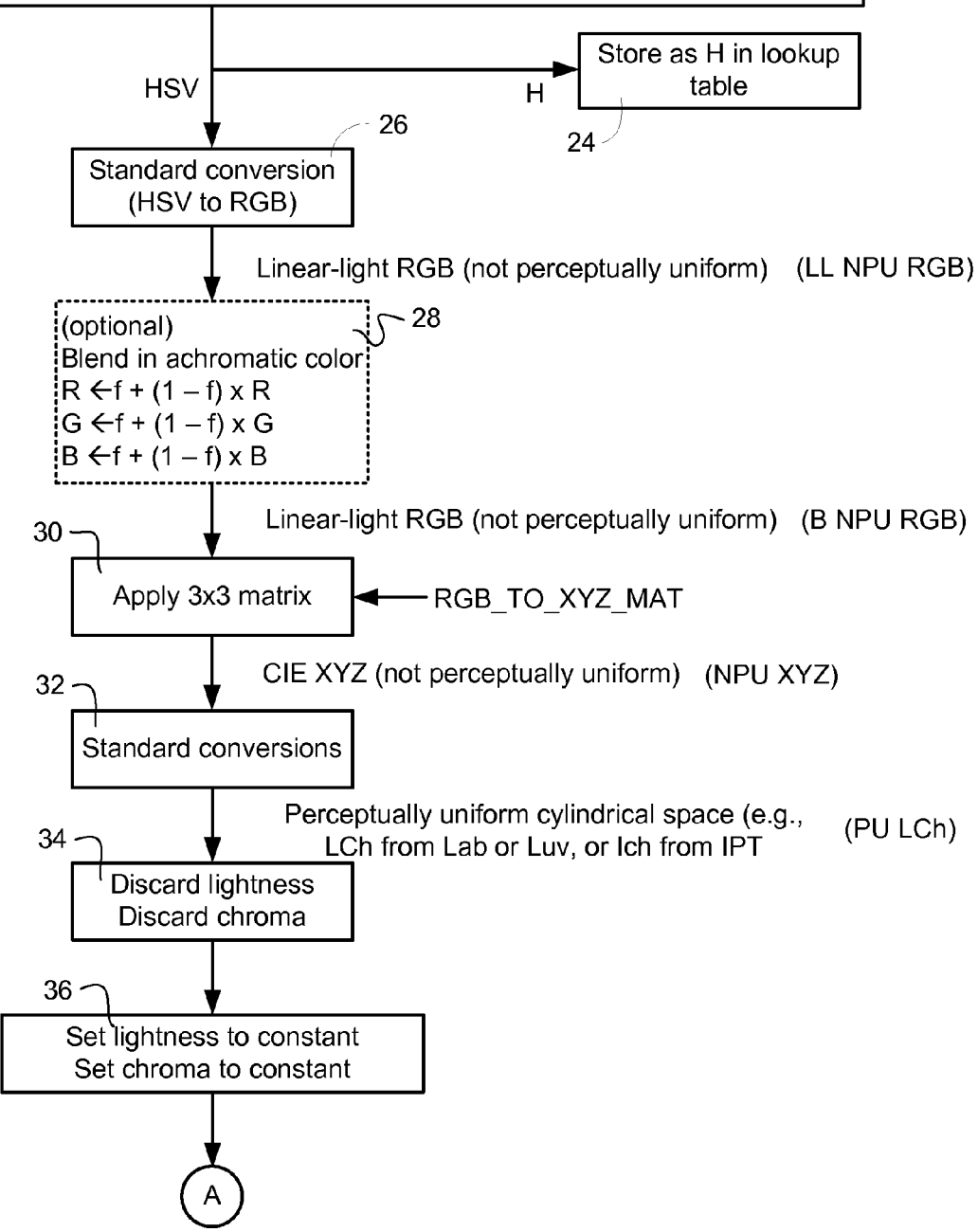
FIG. 3A is chart showing part of an exemplary process for generating a hue scale conversion lookup table.
Figure 3B:
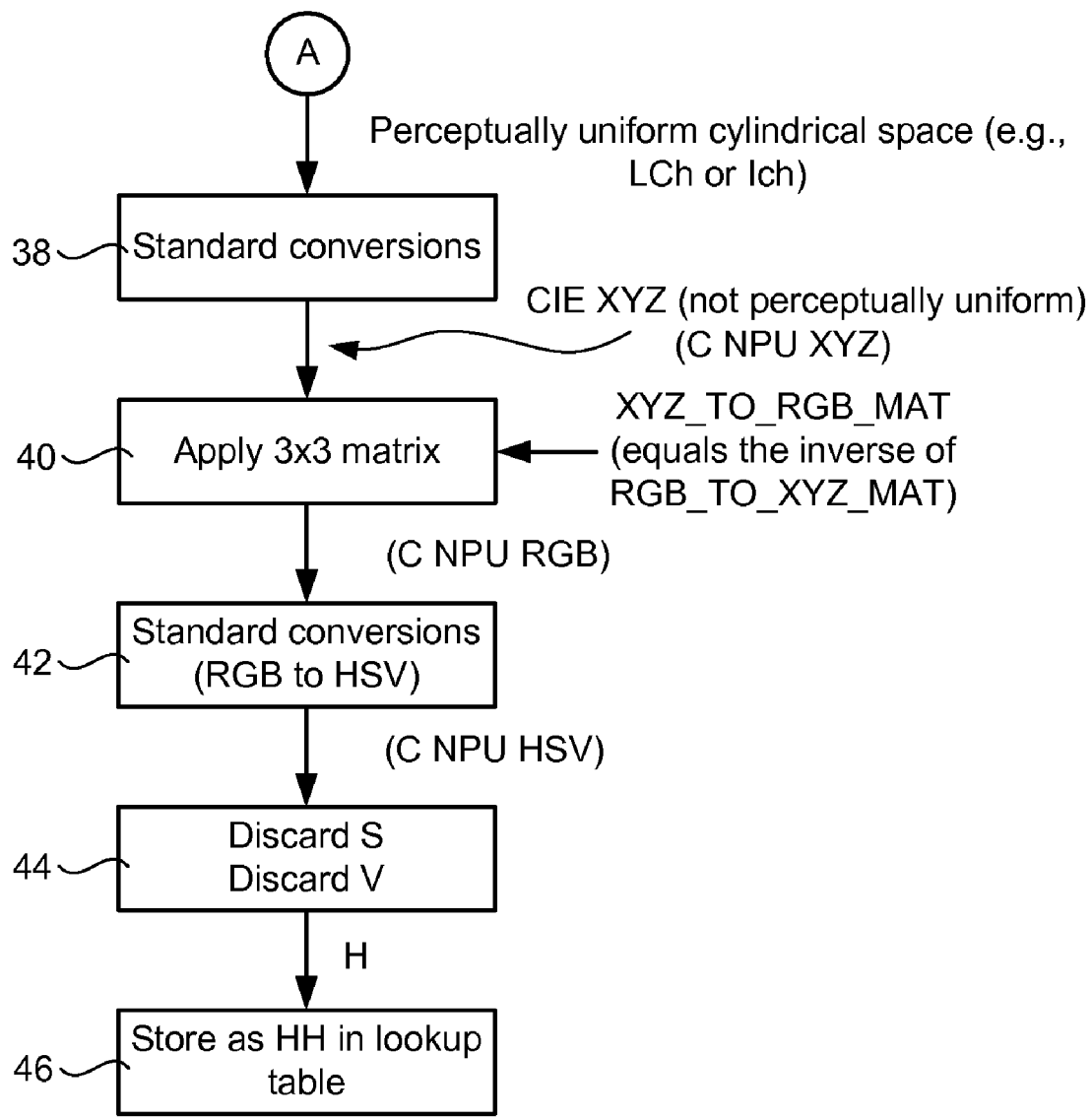
FIG. 3B is chart showing a second part of the exemplary process for generating a hue scale conversion lookup table shown in FIG. 3b.

Aspects of some embodiments of the present invention may be described with reference to FIGS. 3A and 3B. In these embodiments, a hue scale conversion lookup table 6 is initially created. This may be performed by constructing 22 a list of HSV colors where H is uniformly and finely sampled. In some embodiments, the range of H values may extend from −360 degrees (inclusive) to +720 degrees (exclusive) and the values for S and V may be set to constant values (e.g., 1). The H values corresponding to these samples may be stored 24 in hue scale conversion lookup table 6 as initial H values. The HSV samples may also be converted 26 to a linear-light RGB color space, which is not perceptually uniform. These converted samples may be referred to as LL NPU RGB coordinates.

In some embodiments, an achromatic color (e.g., Adjustment 1, described above) may be blended 28 with the LL NPU RGB coordinates to produce B NPU RGB coordinates. However, this is an optional process that may not be used in some embodiments. After blending, when performed, the samples may be converted 30 to the CIE XYZ color space, thereby producing NPU XYZ coordinates. This conversion may be followed by conversion 32 to a cylindrical, perceptually-uniform color space having a hue angle coordinate (denoted by lower-case 'h') as well as lightness and chroma coordinates, and which may comprise conversion to LCh (from CIELAB or CIELUV) or conversion to ICh from IPT. This process may yield PU LCh coordinates. Other spaces known in the art may also be used. Lightness and chroma may then be discarded 34 leaving only the h value. A new, constant lightness value and a constant chroma value may be combined 36 with the h value. In some embodiments, the lightness value, for all samples, may be set to approximately 50% of the maximum lightness value for a reference color volume. In some embodiments, the chroma value, for all samples, may be set to approximately 25% of the maximum chroma value for a reference color volume. Other lightness and chroma constants may be used for all samples so long as the resulting circle in the 3-D perceptually-uniform space (e.g., ICh) falls completely within the volumetric region in the current perceptually-uniform space that represents the color cube of the reference linear-light RGB space. These constant chroma and lightness samples may then be converted 38 to a non-perceptually uniform color space. For example, they may first be converted to the CIE XYZ color space, thereby yielding C NPU XYZ coordinates, and an XYZ-to-RGB matrix may then be applied 40 to the C NPU XYZ coordinates to convert them back to a linear-light RGB color space, which is not perceptually uniform, thereby producing C NPU RGB coordinates. These C NPU RGB coordinates may then be converted 42 to an HSV color space, thereby producing C NPU HSV coordinates. The saturation and value coordinates in the HSV space may then be discarded 44 leaving only a modified hue coordinate, which may be stored 46 as an HH value in a hue scale conversion lookup table 6. Once H and HH values are stored in hue scale conversion lookup table 6, the table is ready for access by the hue shift process 10.

Figure 4:
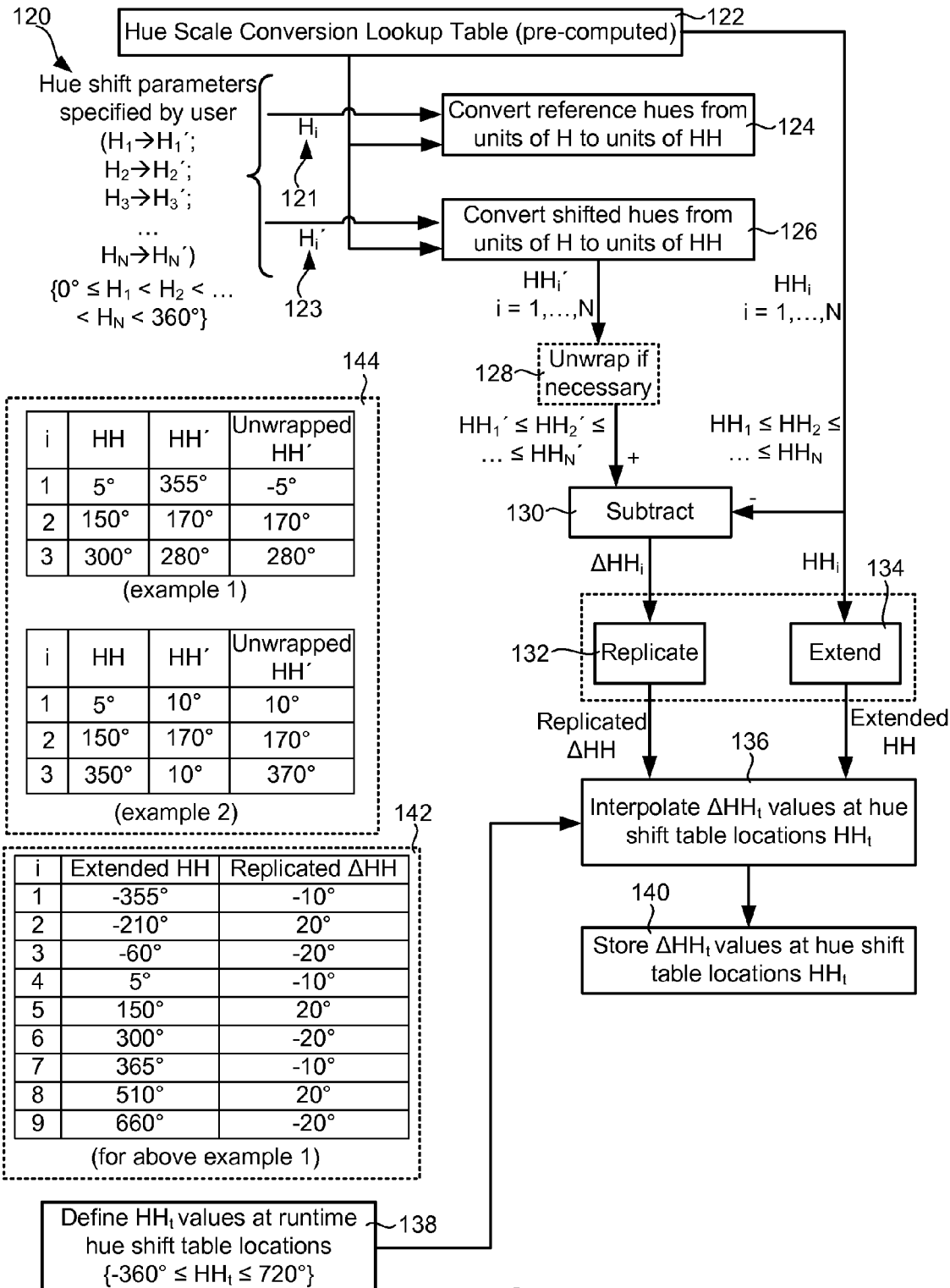
FIG. 4 is a chart showing an exemplary process for generating a run-time lookup table with elements for relating hue values to hue shift values.

Aspects of some embodiments of the present invention may be described with reference to FIG. 4. In these embodiments, a hue scale conversion lookup table (FIG. 2) has been created by a process, such as the exemplary process illustrated in FIGS. 3A to 3B, or another process. In these embodiments, a user has specified hue shift parameters 2 (FIG. 2), 120 that describe desired hue shifting goals with input reference hue values 121 and corresponding shifted hue values 123. These input reference hue values 121 may be converted 124 from H units to HH units through the use of a hue scale conversion lookup table 122 or by similar methods. The shifted output hue values 123 may also be converted 126 to HH units with the hue scale conversion lookup table or by other methods. Because hue units H and HH are typically designated as angles of a circle, the input values typically range from 0 degrees to 360 degrees, however, since hue shifts may extend beyond the limits of a single full circle, the range of hue angles may be 'unwrapped' 128 to extend to angles below 0 degrees and above 360 degrees.

In some embodiments, the range of hue angles may comprise three full revolutions, extending one revolution above and one revolution below the original full circle. If shifted output hue values extend beyond a full circle of rotation, the range of hue angles may be unwrapped 128 to provide negative angles below 0 degrees and positive angles above 360 degrees. For example, when an HH value of 5 degrees correlates with an HH' value of 355 degrees (shifted down by 10 degrees), the HH' value of 355 degrees may be unwrapped to a value of −5 degrees as illustrated in FIG. 4 at 142. Similarly, as shown in example 2 of 142 in FIG. 4, values that extend above 360 degrees may be unwrapped to values in a next revolution (e.g., 350 degrees shifts to 10 degrees). HH values may then be subtracted 130 from HH' values to obtain ΔHH values. These ΔHH values may be replicated 132 to provide similar values in each revolution of the 'unwrapped' hue scale. This replication 144 ensures that shift angles used in the primary range of 0 to 360 degrees are replicated in the adjacent revolutions of the angular scale that range from −360 to 0 degrees and from 360 to 720 degrees. The HH values may also be 'extended' 134 to provide values for areas of the range of hue angles that extend outside the range of 0-360 degrees. As an example, if a user's H specification results in an HH value of 100 degrees, this would be 'extended' by also placing HH values at −260 degrees and +460 degrees.

In some embodiments, a final granularity of the hue scale may be defined 138 to determine a full range of HH values and the corresponding ΔHH values may be determined by interpolation 136. These processes may yield sufficient HH values and corresponding ΔHH values to populate 140 a hue shift lookup table with sufficient detail to allow direct look-up without further interpolation.

Figure 5A:
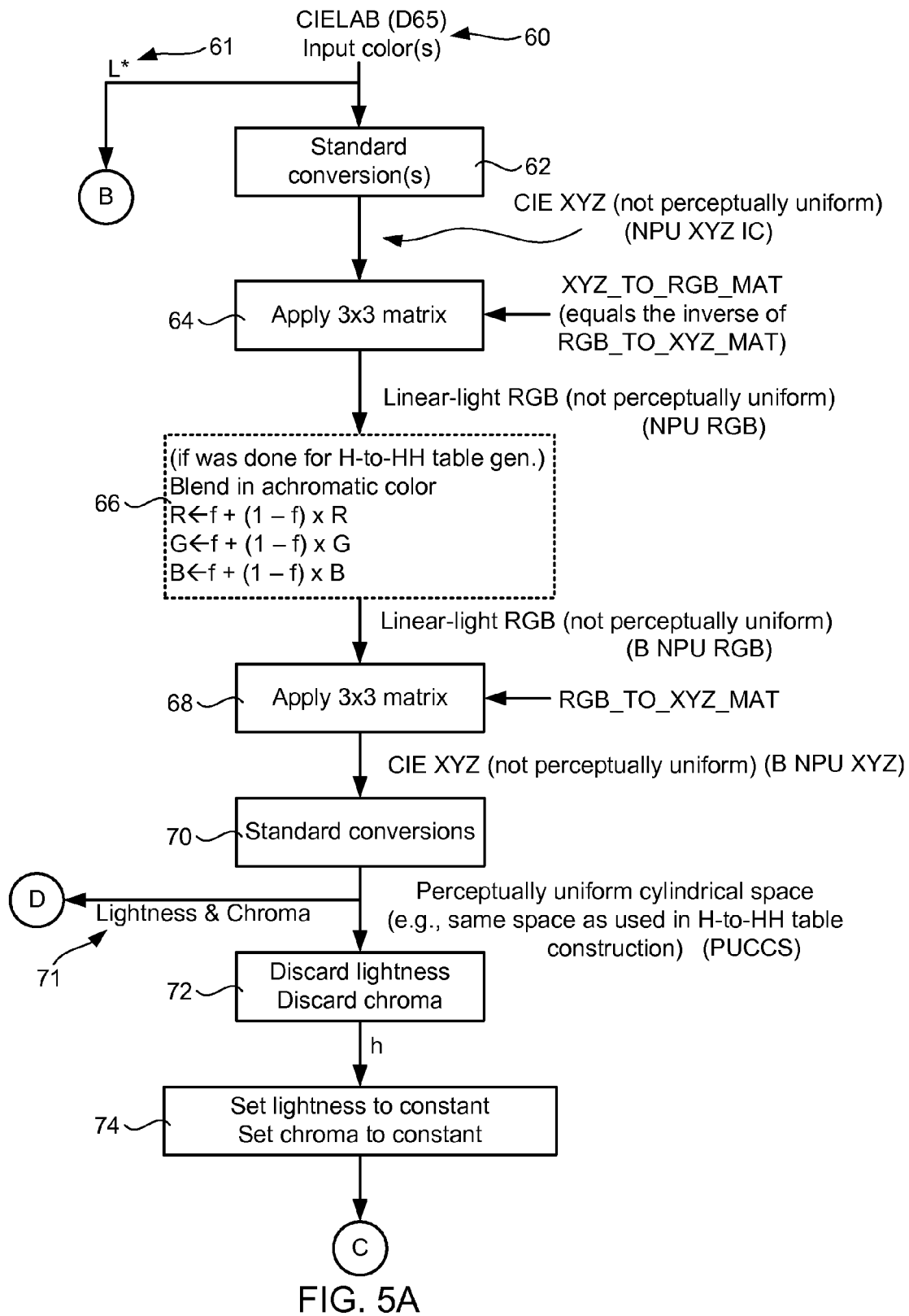
FIG. 5A is a diagram showing a first part of an exemplary process for adjusting image hue values.
Figure 5B:
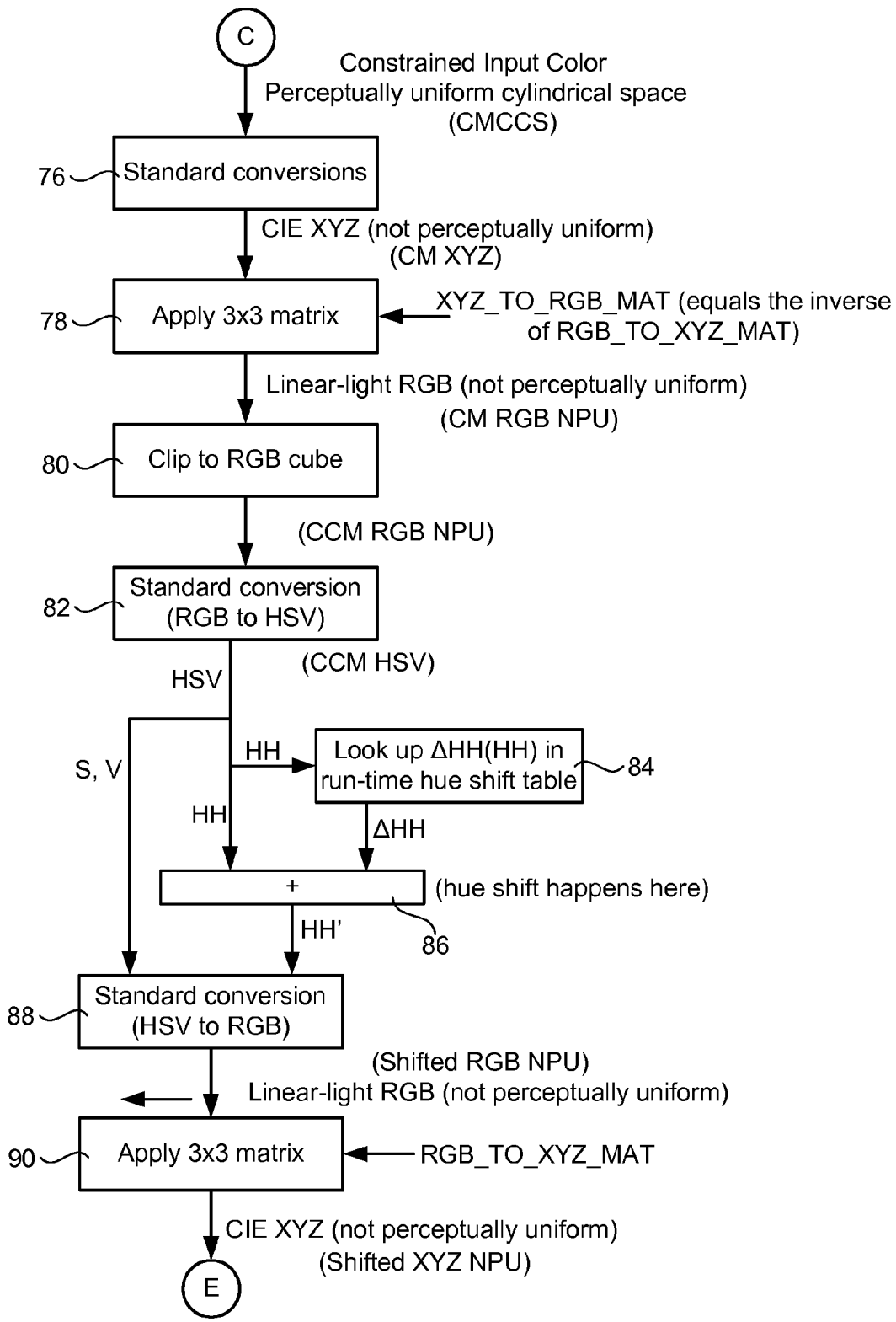
FIG. 5B is a diagram showing a second part of an exemplary process for adjusting image hue values.
Figure 5C:
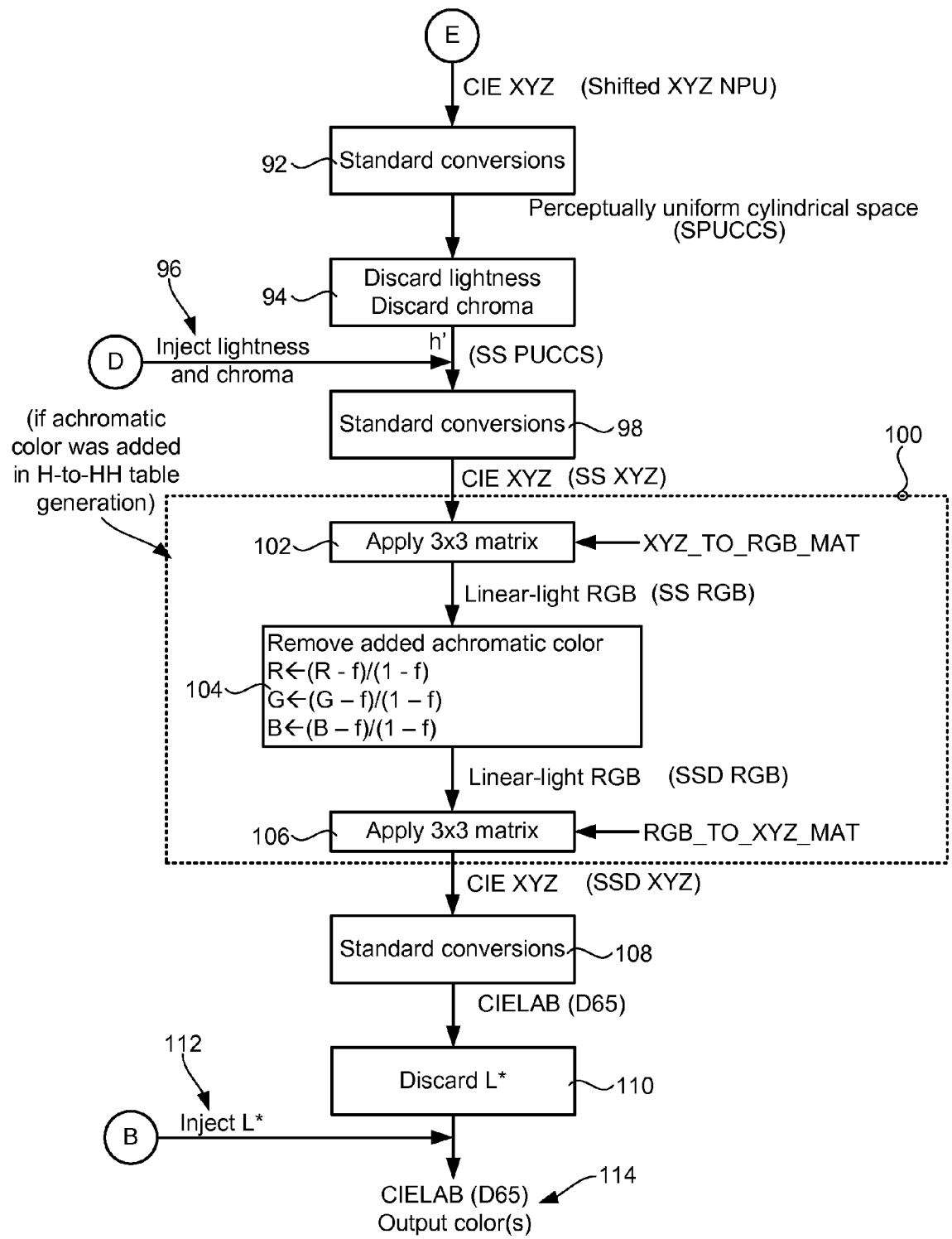
FIG. 5C is a diagram showing a third part of an exemplary process for adjusting image hue values.

Aspects of some embodiments of the present invention may be described with reference to FIGS. 5A-5C. In these exemplary embodiments, color coordinates 60 are input to the system. These input colors may be coded with reference to the CIELAB D65-referenced color space. An original lightness component L* may be saved 61 at this point for inclusion at a later point. The original image input colors 60 may then be converted 62 to the CIE XYZ color space, thereby creating converted XYZ colors, which may be referred to as NPU XYZ input coordinates (NPU XYZ IC). An XYZ-to-RGB matrix may then be applied 64 to the converted XYZ values to bring them into a linear-light RGB color space, which is non-perceptually-uniform (NPU). This process creates NPU RGB colors. If an achromatic color was blended (e.g. 28 in FIG. 3A) during the creation of hue scale conversion lookup table 6, the same achromatic color may also be blended 66, at this point, with the NPU RGB color values, thereby creating B NPU RGB coordinates.

An RGB-to-XYZ matrix, which may be the inverse of the previously-applied XYZ-to-RGB matrix, may then be applied 68 to the blended B NPU RGB values. The resulting CIE XYZ, non-perceptually-uniform values (B NPU XYZ values) may then be converted 70 to a perceptually uniform, cylindrical color space, such as an LCh or ICh color space, resulting in PUCCS values. The lightness and chroma values of these PUCCS values may then be stored 71 for later use and discarded 72. The remaining h values for each color may then be combined 74 with constant lightness and constant chroma values. In some embodiments, the lightness value, for all samples, may be set to approximately 50% of the maximum lightness value for a reference color volume. In some embodiments, the chroma value, for all samples, may be set to approximately 25% of the maximum chroma value for a reference color volume. Other lightness and chroma constants may be used for all samples so long as the resulting circle in the 3-D perceptually-uniform space (e.g., ICh) falls completely within the volumetric region in the perceptually-uniform space that represents the reference color volume. In some embodiments, the reference color volume corresponds to an RGB cube, i.e., the color gamut obtained when amounts of R, G, B primaries of known colorimetry are independently allowed to take on any values between 0 and respective maximum amounts. This process results in constant-modified PUCCS values, which may be referred to as CMCCS values.

The CMCCS values may then be converted 76 to the CIE XYZ color space thereby creating constant-modified XYZ (CM XYZ) values. The XYZ-to-RGB matrix may then be applied 78 to the CM XYZ values to generate constant-modified RGB NPU (CM RGB NPU) values. These CM RGB NPU values may then be clipped 80 to an RGB cube thereby creating clipped RGB (CCM RGB NPU) values. The CCM RGB NPU values may then be converted 82 to an HSV color space, thereby yielding CCM HSV values. The CCM HSV values comprise an HH value, representing hue, which may be used as an index into a hue shift lookup table (HH-to-ΔHH table) 84, while the other CCM HSV values, S and V, are stored for later use.

The output from the hue shift lookup table (HH-to-ΔHH table) 84 process, ΔHH, is then input to the hue shift process 86 along with the CCM HH value. Here, the ΔHH and HH values are used to generate an HH' value. The HH' value and the CCM S and V values may then be combined and input to an HSV-to-RGB process 88, which will result in linear-light RGB values in a non-perceptually-uniform color space. These values may be referred to as Shifted RGB NPU values. The shifted RGB NPU values may then be converted 90 with an RGB-to-XYZ matrix operation to yield Shifted XYZ NPU values. These Shifted XYZ NPU values may then be converted 92 to a perceptually uniform cylindrical space with lightness, chroma and hue coordinates, thereby producing SPUCCS coordinates. In this space, the lightness and chroma coordinates may be discarded 94 and the lightness and chroma coordinates from the previously-stored PUCCS values may be substituted 96 in their place. This process will result in substituted, shifted coordinates in a perceptually-uniform color space, which may be referred to as SS PUCCS values. These SS PUCCS values may then be converted 98 to CIE XYZ values, referred to as SS XYZ values.

If an achromatic color was blended earlier (FIG. 3A at 28 and FIG. 5A at 66), the SS XYZ values may be further converted 102 to a linear-light RGB color space with an XYZ-to-RGB matrix, or by other means, which yields SS RGB coordinates. If an achromatic color was blended earlier for a mathematical purpose such as enforcing monotonic relationships among pairs of H, HH and h coordinates, the same achromatic color that was added in an earlier process may then be removed 104, resulting in de-flared values, which may be referred to as SSD RGB values. These de-flared SSD RGB values may be converted 106 back to the CIE XYZ color space with an RGB-to-XYZ matrix or otherwise. The process will result in shifted, substituted and de-flared XYZ coordinates, which may be referred to as SSD XYZ values.

These SSD XYZ values may then be further converted 108 to the CIELAB (D65) color space or another opponent color space used for the original input colors. In this color space the lightness or luminance values may be discarded 110 and the lightness or luminance value previously saved 61 from the original input color may be substituted 112 in its place. This substitution step 112 will result in hue-shifted output colors 114 in the same color space as the original input color.

Figure 6:
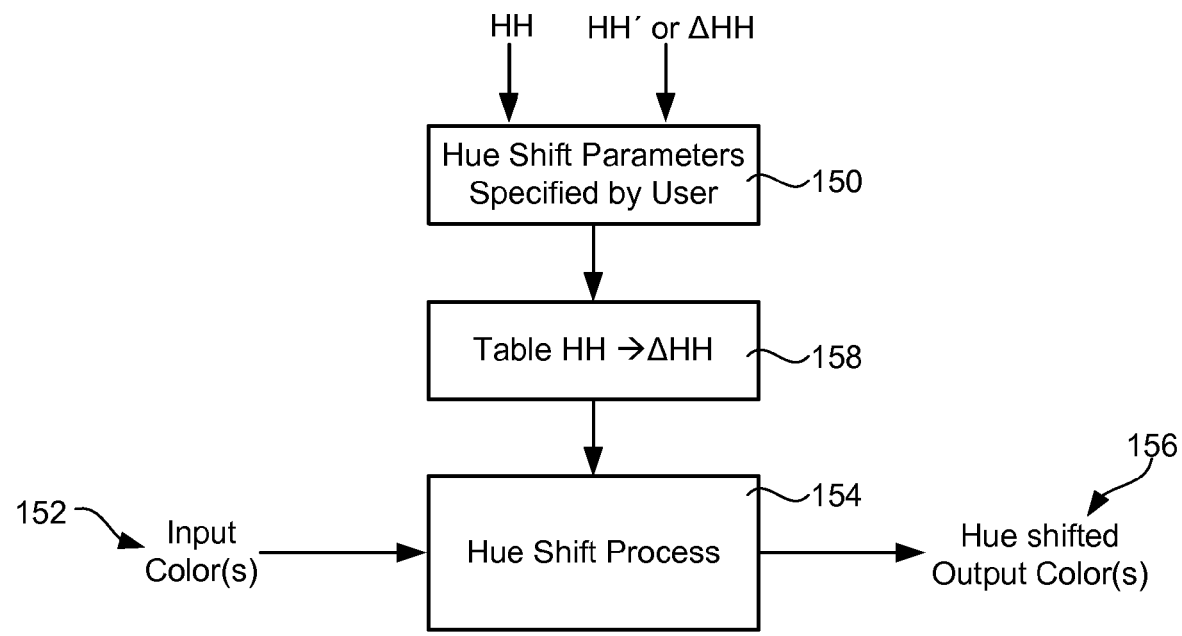
FIG. 6 is a chart showing an exemplary hue shift process wherein hue shift values are input in a non-perceptually-uniform color space.

Some embodiments of the present invention may function without pre-constructed look-up tables or complex pre-processing conversion techniques. In some exemplary embodiments, described with reference to FIG. 6, a user may specify 150 reference modified hue values (HH) and shifted modified hue values (HH') in units that refer to a non-perceptually-uniform color space. Alternatively, a user may specify 150 reference modified hue values (HH) and corresponding modified hue shift values (ΔHH). When ΔHH values are not specified, they may be determined by subtracting HH values from corresponding HH' values, as explained above for other embodiments. With this input, these embodiments may generate a hue shift table 158 that relates HH values to ΔHH shift values in units of a non-perceptually-uniform color space. In some embodiments, interpolation may be used to obtain values between those specified by a user.

Input colors 152, which may comprise input image coordinates or the color coordinates associated with color lookup table (CLUT) points in an ICC profile for embodiments related to ICC profile generation, may then be input to a hue shift process 154 wherein the color coordinates are converted to the non-perceptually-uniform color space and the converted coordinates are then shifted using the ΔHH values that correspond to their converted HH values. This process will yield shifted hue coordinates in the units of the non-perceptually-uniform color space. These shifted hue coordinates may then be converted to the original image color space and output as hue shifted output color coordinates 156.

Figure 7:
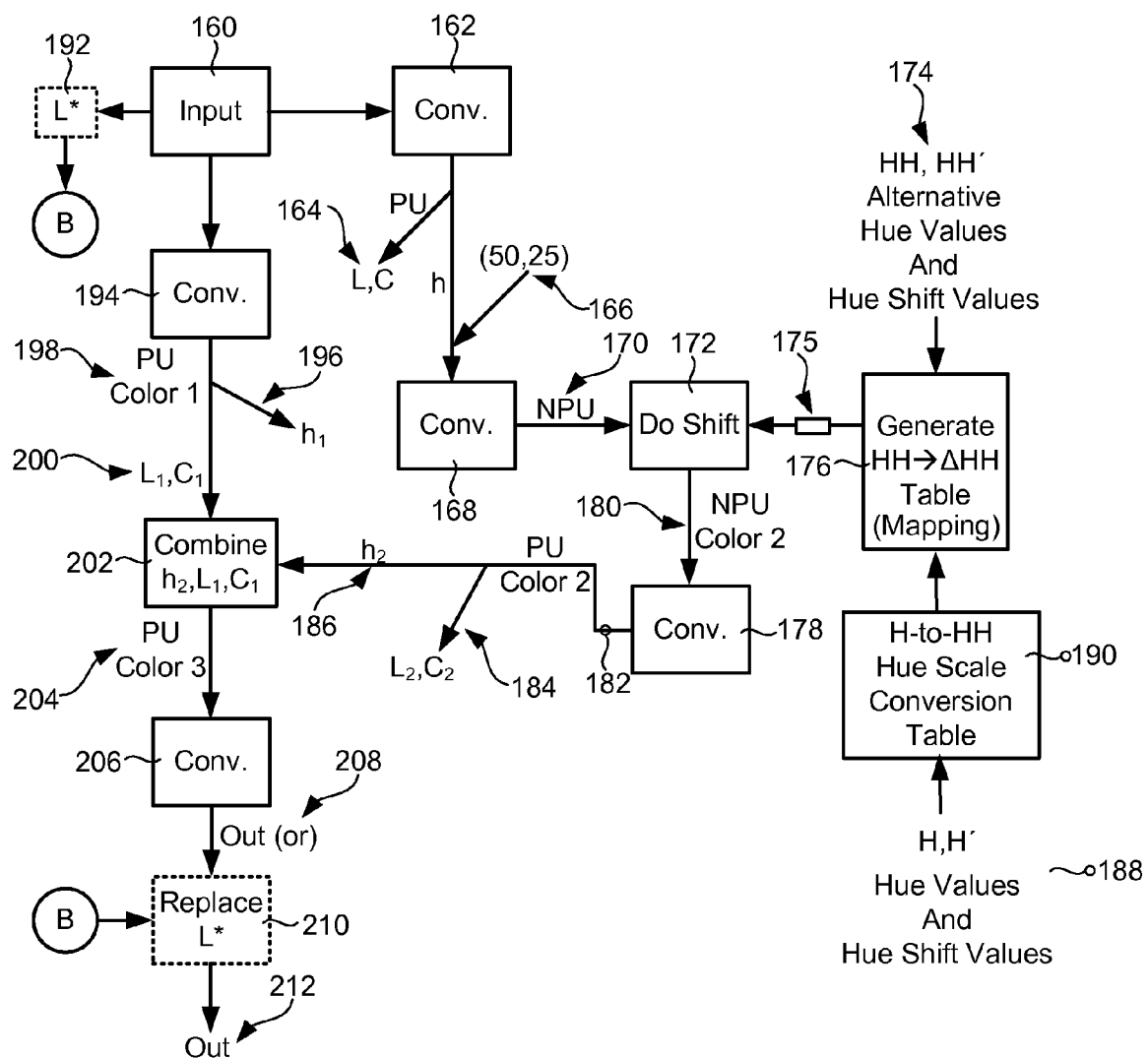
FIG. 7 is a diagram showing an exemplary hue shift process.

Some embodiments of the present invention may be described with reference to FIG. 7. In these embodiments, color input coordinates are received 160 for processing. These color input coordinates may comprise a color input image, that comprises a single color representing the color of a graphical or textual object in a digital document specified in a page description language, or one or more pixels of an image, or may comprise a broad range of colors represented in a plurality of pixels of an image. In some embodiments, a color input image may also comprise multiple image frames with multiple colors and pixels in each frame. A color input image may be communicated in a plurality of image formats and/or color spaces. In some embodiments, color input coordinates may represent a collection of colors associated with CLUT points. In an exemplary embodiment, color input coordinates may represent a collection of colors associated with CLUT points of a B2Ax tag of an ICC profile. In an exemplary embodiment, color input coordinates may be communicated in a format using a colorimetry-based color space. In some exemplary embodiments, color input coordinates may be communicated in a Commission Internationale d'Eclairage (L*, a*, b*) (CIELAB) color space.

In some embodiments, a luminance coordinate, luminance characteristic or luminance-related characteristic of the color input coordinates may be stored or otherwise preserved 192 for later combination with elements of a processed image.

In some embodiments, the input color coordinates may be converted 162 to a perceptually-uniform cylindrical color space (PUCCS), the converted coordinates thereby comprising a PUCCS lightness coordinate, a PUCCS chroma coordinate and, in some cases, one or more other PUCCS coordinates, such as a PUCCS hue coordinate. In some embodiments, the PUCCS lightness coordinate value and/or the PUCCS chroma coordinate value may be discarded 164 and replaced 166 with constant values. In some embodiments, only the lightness coordinate may be replaced, in other embodiments, only the chroma coordinate may be replaced, however, in an exemplary embodiment, both the lightness and chroma coordinates may be replaced with constant values for all colors in the PUCCS color range. That is, no matter what color is represented by the PUCCS coordinates, the lightness coordinate value will be replaced by the same constant value and the chroma coordinate will be replaced by another constant value.

In some embodiments, the PUCCS lightness coordinate value may be replaced 166 by a constant lightness value that is approximately one half of a maximum lightness value for the lightness range of the PUCCS. In some embodiments, the chroma coordinate may be replaced by a constant chroma value, wherein the constant chroma value is sufficiently low that the resulting color is located inside a reference color volume when converted to the color space of that reference color volume. In some embodiments, the reference color volume may be an sRGB color cube. In some embodiments, including some using an sRGB color cube, the constant chroma value may be approximately 25% of the maximum chroma value for that cube. The color resulting from replacement of the lightness and/or chroma coordinate of the PUCCS coordinates by constant value(s) may be referred to as a constrained input color.

The constrained input color may then be converted 168, through one or more processes, to a non-perceptually-uniform (NPU) color space, such as a linear-light RGB space. These constrained, NPU coordinates 170 may then be sent to a hue shift module 172 for a hue shifting process.

The hue shift process may comprise application of a hue shift lookup table 175, which may, in some embodiments, have been generated 176 based on reference hue values and corresponding hue shift values 188 input by a designer or user. These reference hue values and hue shift values may then be used as indices in a hue scale conversion table 190. This process will yield modified reference hue values and hue shift values that may then be used in a hue shift table generation process 176. In alternative embodiments, the modified reference hue values and hue shift values 174 may be input by a user and passed directly to the hue shift table generation process 176. In some embodiments, the hue shift lookup table 175 may be generated in advance of image rendering or profile generation and may be generated by many methods known to those skilled in the art.

In an exemplary hue shift process, a hue value associated with a constrained NPU color may be used as an index to the hue shift lookup table, which provides a corresponding hue shift value to be added or otherwise applied to the constrained NPU color hue value to effect a hue shift thereby resulting in a shifted NPU hue value, which may be combined with other coordinates of the constrained NPU color to generate a shifted NPU color 180. The shifted NPU color 180 may then be converted 178 to a shifted perceptually-uniform (PU) color 182 in a cylindrical color space comprising a hue coordinate, a lightness coordinate and a chroma coordinate. The lightness coordinate and chroma coordinate of the shifted PU color 182 may then be discarded 184 so that the shifted PU hue coordinate 186 may be combined with other coordinates.

The input color 160 may also be converted 194 to a perceptually-uniform color space comprising a hue coordinate and at least one other coordinate, thereby creating a PU input color 198. The hue coordinate of this PU input color may be discarded 196 and the remaining at least one other coordinate 200 may be combined 202 with the shifted PU hue coordinate 186 to create a combined PU color 204.

In some embodiments, the combined PU color 204 may be converted 206 to an output color space color 208 and may represent a color in an output image. In other embodiments, the luminance coordinate, luminance characteristic or luminance-related characteristic of the color input image, previously stored 192 for later use, may be used to replace 210 a corresponding coordinate or characteristic in the converted, combined PU color 208 to produce an output color 212, which thereby possesses a luminance coordinate, luminance characteristic or luminance-related characteristic identical to that of the input color 160.

Figure 8:
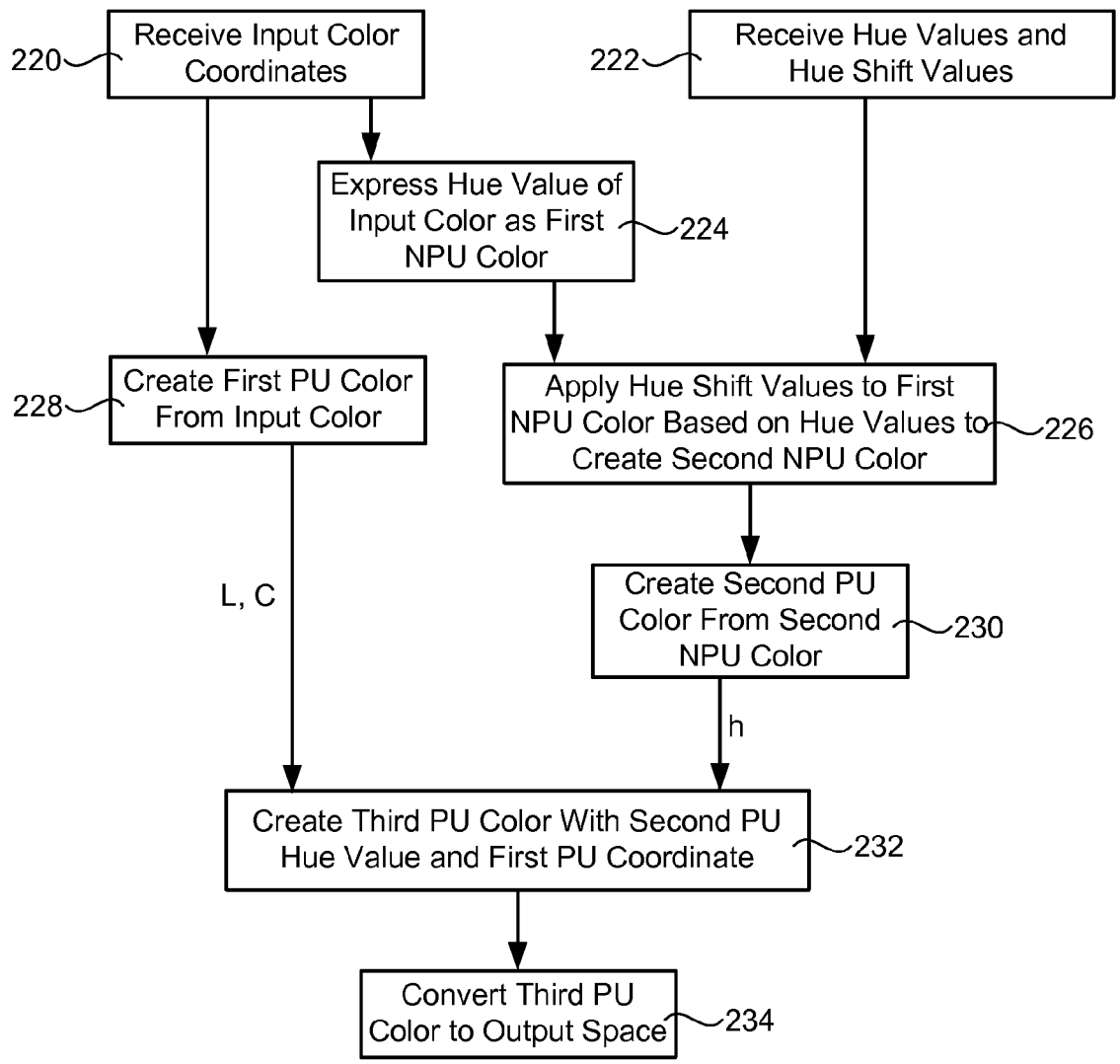
FIG. 8 is a chart showing steps of an exemplary hue shift process comprising the combination of a shifted hue value with converted coordinates of an input image.

Some embodiments of the present invention may be described with reference to FIG. 8. In these embodiments, input color coordinates are received 220 at a computing device. Input color coordinates may be part of an image file or may be color coordinates associated with CLUT points in a B2Ax tag of an ICC profile being generated by an ICC profile generation tool employing an embodiment of the present invention. Hue characteristics of these input color coordinates may then be expressed 224 as colors in a first non-perceptually-uniform color space (NPU). This process may be performed with one or more of steps 60 through 82 as explained in relation to FIGS. 5A and 5B or by similar methods. In some embodiments, the hue characteristics or coordinates of input colors may be combined with constant values for other coordinates to produce NPU colors from the input hue attributes.

Hue values and corresponding hue shift values may also be received 222 at the computing device or a connected computing device. These hue values and hue shift values may be communicated in the form of a hue shift lookup table that relates hue values to corresponding hue shift values to be applied to the related hue values in a hue shift process. These hue shift values may be applied 226 to the hue coordinates or attributes of the first NPU colors to create shifted hue values and corresponding second NPU colors.

The second NPU colors may then be converted 230 to second perceptually-uniform (PU) colors by converting to a perceptually-uniform color space. First PU colors may also be created by converting 228 the input image coordinates to the PU space. Hue attributes or coordinates from the second PU colors may then be combined with other coordinates (e.g., chroma, lightness, value) from the first PU colors to produce third PU colors 232. These third PU colors may then be converted 234 to an output color space.

Figure 9:
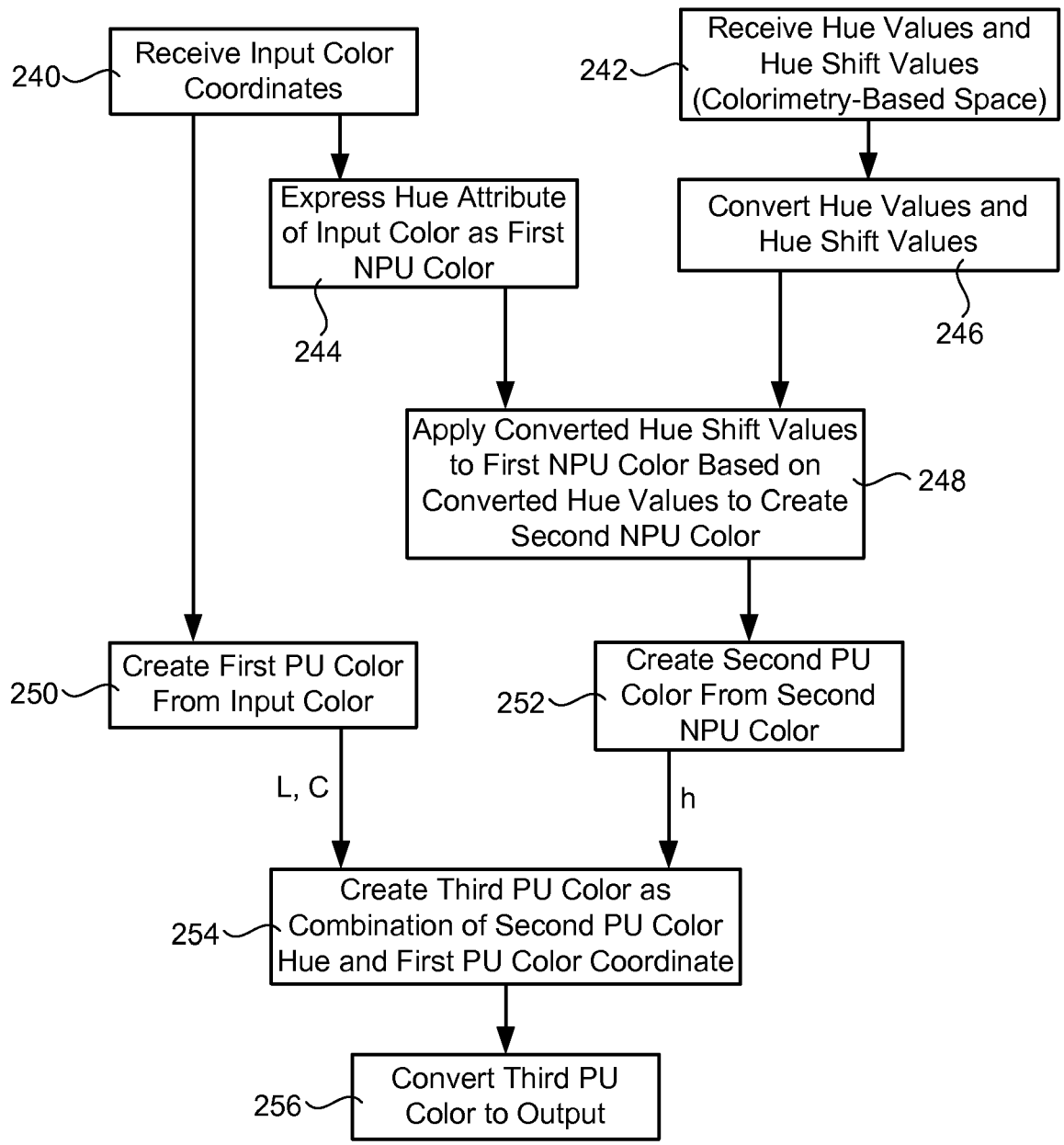
FIG. 9 is a chart showing steps of an exemplary hue shift process comprising application of hue shift values mapped to a non-perceptually-uniform (NPU) color space.

Some embodiments of the present invention may be described with reference to FIG. 9. In these embodiments, input color coordinates are received 240 at a computing device. Input color coordinates may be part of an image file or may be color coordinates associated with CLUT points in a B2Ax tag of an ICC profile being generated by an ICC profile generation tool employing an embodiment of the present invention. Hue characteristics of these input color coordinates may then be expressed 244 as first colors in a non-perceptually-uniform color space (NPU). This process may be performed with one or more of steps 60 through 82 as explained in relation to FIGS. 5A and 5B or by similar methods. In some embodiments, the input image colors may be represented in a perceptually uniform (PU) color space, the hue coordinates of the image colors as represented in the PU color space may be combined with constant values for other coordinates in the PU color space, and the result may be converted to the NPU space, thereby producing first NPU colors from the input image hue attributes.

Hue values and corresponding hue shift values, represented in a colorimetry-based color space, may also be received 242 at the computing device or a connected computing device. These hue values and hue shift values may be processed and converted 246 whereby one or more of their original numerical values may be modified, but the modified numerical values still represent the same visual hue as the original numerical values. This conversion may comprise the use of a hue scale conversion lookup table. The converted values may then be expressed in the form of a hue shift lookup table that relates hue values to corresponding hue shift values to be applied to the related hue values in a hue shift process. These hue shift values may be applied 248 to the hue coordinates or attributes of the first NPU colors to create corresponding second NPU colors having shifted hue coordinates or attributes.

The second NPU colors may then be converted 252 to second perceptually-uniform (PU) colors by converting to a perceptually-uniform color space. First PU colors may also be created by converting 250 the input image coordinates to the PU space. Hue attributes or coordinates from the second PU colors may then be combined 254 with other coordinates (e.g., chroma, lightness) from the first PU colors to produce third PU colors. These third PU colors may then be converted 256 to an output color space.

Figure 10:
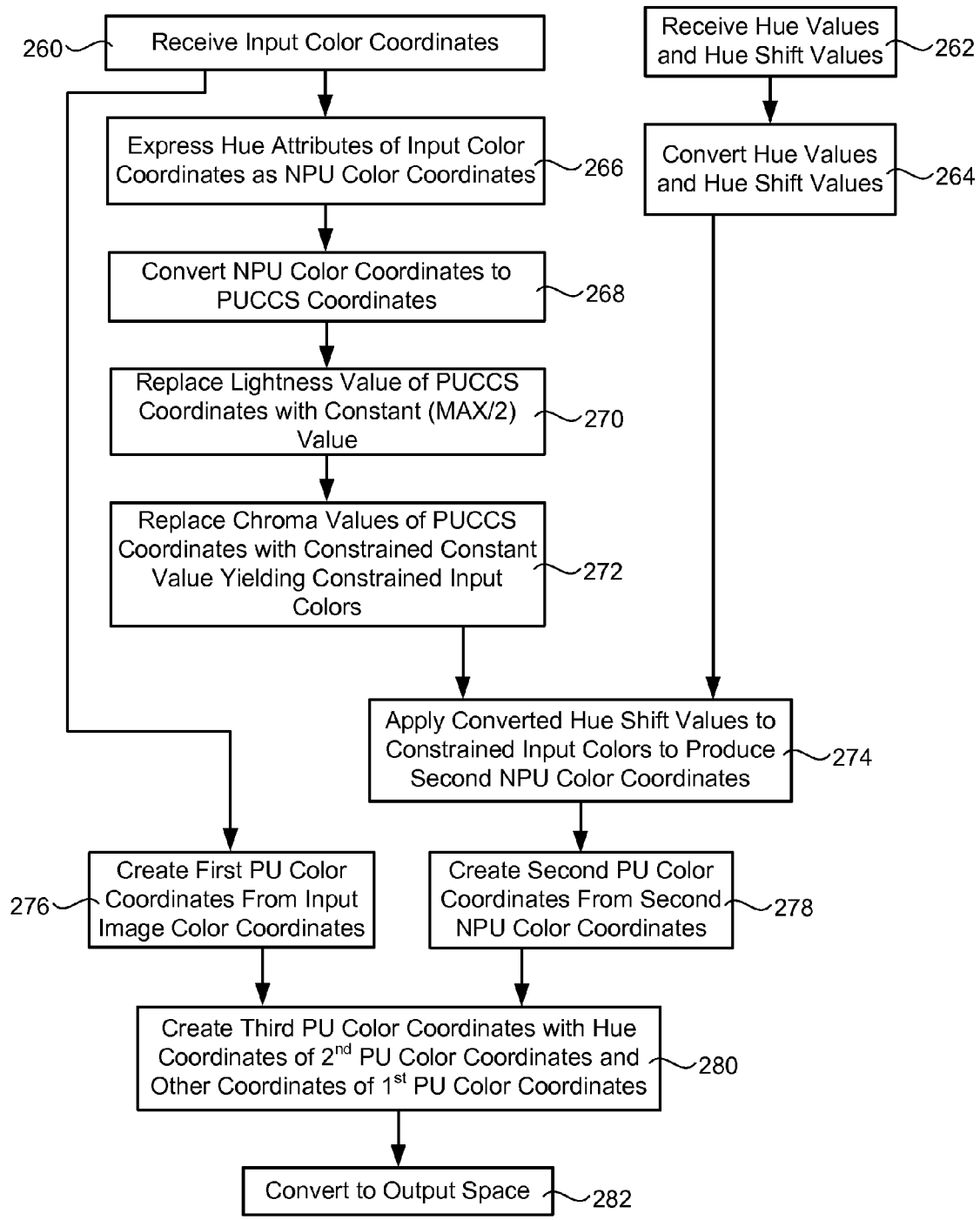
FIG. 10 is a chart showing steps of an exemplary hue shift process comprising combination of a hue coordinate with constant lightness and chroma coordinates.

Some embodiments of the present invention may be described with reference to FIG. 10. In these embodiments, input color coordinates are received 260 at a computing device. Input color coordinates may be part of an image file or may be color coordinates associated with CLUT points in a B2Ax tag of an ICC profile being generated by an ICC profile generation tool employing an embodiment of the present invention. Hue characteristics or coordinates of these input color coordinates may then be expressed 266 as first NPU colors in a non-perceptually-uniform color space (NPU). The first NPU colors may then be converted 268 to a perceptually-uniform cylindrical color space (PUCCS) thereby creating PUCCS coordinates.

In some embodiments, the PUCCS lightness coordinates may be replaced 270 by a constant value. In some embodiments, this constant value will be applied to all colors and will have a value of approximately halfway between the minimum lightness value and the maximum lightness value for a reference color volume in the PUCCS.

In some embodiments, the PUCCS chroma coordinates may be replaced 272 with a constant chroma value. This constant may be applied to all colors. In some embodiments, the chroma coordinates may be replaced by a constant chroma value, wherein the constant chroma value is sufficiently low that the resulting color is located inside a reference color volume in the PUCCS. In some embodiments, the reference color volume may comprise the region within the PUCCS which bijectively corresponds to an sRGB color cube. In some embodiments, including some using an sRGB color cube, the constant chroma value may be approximately 25% of the maximum chroma value for the region within the PUCCS which bijectively corresponds to that color cube. The colors resulting from replacement of the lightness and/or chroma coordinates of the PUCCS coordinates may be referred to as constrained input colors. In some embodiments, this process may be performed with one or more of steps 60 through 82 as explained in relation to FIGS. 5A and 5B or by similar methods.

Hue values and corresponding hue shift values may also be received 262 at the computing device or a connected computing device. These hue values and hue shift values may be processed and converted 264 whereby one or more of their original numerical values may be modified, but the modified numerical values still represent the same visual hue as the original numerical values. This process may comprise the use of a hue scale conversion lookup table. The mapped values may then be expressed in the form of a hue shift lookup table that relates hue values to corresponding hue shift values to be applied to the related hue values in a hue shift process. These hue shift values may be applied 274 to the hue coordinates or attributes of the constrained input colors to create shifted hue values and corresponding second NPU colors.

The second NPU colors may then be converted 278 to second perceptually-uniform (PU) colors by converting to a perceptually-uniform color space. First PU colors may also be created by converting 276 the input color coordinates to the PU space. Hue attributes or coordinates from the corresponding second PU colors may then be combined 280 with other coordinates (e.g., chroma, lightness) from corresponding first PU colors to produce third PU colors. These third PU colors may then be converted 282 to an output color space.

The terms and expressions which have been employed in the foregoing specification are used therein as terms of description and not of limitation, and there is no intention in the use of such terms and expressions of excluding equivalence of the features shown and described or portions thereof.

What is claimed is:

1. A method for shifting the hue of an input color represented by numeric input coordinates of an input color space, thereby creating an output color represented by numeric output coordinates of an output color space, said method comprising:
    a) receiving a plurality of hue values and corresponding hue shift values at a computing device, wherein said values are defined by at least one coordinate in a non-perceptually-uniform color space (NPU space), said NPU space being indexed by a hue coordinate, HH, together with at least one other coordinate;
    b) expressing the hue attribute of said input color as a first NPU color represented in the coordinates of said NPU space;
    c) applying said hue shift values to said first NPU color based on said hue values, thereby creating a second NPU color having a shifted hue attribute;
    d) creating a first PU color by representing said input color in the coordinates of a PU space, said PU space being a perceptually uniform color space indexed by a hue coordinate, h, together with at least one other coordinate;
    e) creating a second PU color by representing said second NPU color in the coordinates of said PU space;
    f) creating a third PU color by combining the hue coordinate of said second PU color together with another coordinate of said first PU color; and
    g) creating said output color by converting said third PU color to said output color space.

2. A method as described in claim 1 wherein said expressing said hue attribute of said input color as a first NPU color comprises converting said input color to a color space comprising a hue coordinate and a lightness coordinate, and replacing said lightness coordinate with a constant lightness value that is approximately one half of a maximum lightness value of a reference color volume.

3. A method as described in claim 1 wherein said expressing said hue attribute of said input color as a first NPU color comprises converting said input color to a color space comprising a hue coordinate and a chroma coordinate, and replacing said chroma coordinate with a constant chroma value, thereby creating a constrained input color, wherein said constant chroma value is sufficiently low that said constrained input color is located inside a reference color volume.

4. A method as described in claim 1 wherein said expressing said hue attribute of said input color as a first NPU color comprises:
    a) converting said input color to a color space comprising a hue coordinate, a chroma coordinate and a lightness coordinate; and
    b) replacing said lightness coordinate with a constant lightness value that is approximately one half of a maximum lightness value of a reference color volume and replacing said chroma coordinate with a constant chroma value, thereby creating a constrained input color, wherein said constant chroma value is sufficiently low that said constrained input color is located inside said reference color volume.

5. A method as described in claim 4 further comprising converting said constrained input color to said NPU color space.

6. A method as described in claim 1 wherein said creating a third PU color comprises combining the hue coordinate of said second PU color together with a lightness coordinate and a chroma coordinate of said first PU color.

7. A method as described in claim 1 wherein the coordinate systems of said input color space and said output color space are substantially similar and comprise a luminance coordinate.

8. A method as described in claim 7 further comprising replacing a luminance-related attribute of said output color with a luminance-related attribute of said input color.

9. A method for shifting the hue of an input color represented by numeric input coordinates of an input color space, thereby creating an output color represented by numeric output coordinates of an output color space, said method comprising:
    a) receiving a plurality of hue values and hue shift values at a computing device, wherein said hue values and said hue shift values are defined by coordinates in a colorimetry-based color space;
    b) applying a hue scale conversion process to said hue values and said hue shift values, thereby creating converted hue values and converted hue shift values;
    c) expressing the hue attribute of said input color as a first non-perceptually-uniform (NPU) color represented in the coordinates of an NPU color space;

d) applying said converted hue shift values to said first NPU color based on said converted hue values, thereby creating a second NPU color having a shifted hue attribute;

e) creating a first perceptually uniform (PU) color by representing said input color in the coordinates of a PU color space, the PU space comprising a perceptually uniform color space indexed by a hue coordinate, h, together with at least one other coordinate;

f) creating a second PU color by representing said second NPU color in the coordinates of said PU space;

g) creating a third PU color by combining the hue coordinate of said second PU color together with another coordinate of said first PU color; and h) creating said output color by converting said third PU color to said output color space.

10. A method as described in claim 9 further comprising:
a) expressing a set of initial hue coordinates as hue mapping colors represented in the coordinates of said NPU space;
b) creating PU hue mapping colors by representing said hue mapping colors in the coordinates of said PU space;
c) extracting hue coordinates of said PU hue mapping colors; and
d) relating said extracted hue coordinates to corresponding initial hue coordinates, thereby creating a hue scale conversion lookup table used in said hue scale conversion process.

11. A method as described in claim 9 wherein said expressing the hue attribute of said input color as a first non-perceptually-uniform (NPU) color comprises blending an achromatic color with said hue mapping color in a linear light color space.

12. A method as described in claim 11 wherein said representing said input color in the coordinates of said PU space comprises blending an achromatic color with said hue input color in a linear light color space.

13. A method as described in claim 9 wherein said expressing the hue attribute of said input color as a first non-perceptually-uniform (NPU) color comprises:
a) converting said PU hue mapping colors to a color space comprising a hue coordinate and a lightness coordinate, and
b) replacing said lightness coordinate with a constant lightness value that is approximately one half of a maximum lightness value of a reference color volume.

14. A method as described in claim 9 wherein said expressing the hue attribute of said input color as a first non-perceptually-uniform (NPU) color comprises converting said input color to a color space comprising a hue coordinate and a chroma coordinate, and replacing said chroma coordinate with a constant chroma value, thereby creating a constrained input color, wherein said constant chroma value is sufficiently low that said constrained input color is located inside a reference color volume.

15. A method as described in claim 9 wherein said expressing the hue attribute of said input color as a first non-perceptually-uniform (NPU) color comprises converting said PU hue mapping colors to a color space comprising a hue coordinate, a chroma coordinate and a lightness coordinate, replacing said lightness coordinate with a constant lightness value that is approximately one half of a maximum lightness value of a reference color volume and replacing said chroma coordinate with a constant chroma value thereby creating a constrained input color, wherein said constant chroma value is sufficiently low that said constrained input color is located inside said reference color volume.

16. A method for color processing of colors represented by a plurality of numeric input color coordinates of an input color space, thereby creating a plurality of numeric output coordinates of an output color space, said method comprising:
a) receiving a plurality of hue values and corresponding hue shift values at a computing device, wherein said hue values and said corresponding hue shift values are defined by coordinates in a colorimetry-based color space;
b) applying a hue scale conversion process to said hue values and said hue shift values, thereby creating converted hue values and converted hue shift values;
c) expressing the hue attributes of said input color coordinates as a plurality of first NPU colors represented by first NPU color coordinates of said NPU space;
d) converting said NPU color coordinates to a color space comprising a hue coordinate, a chroma coordinate and a lightness coordinate, thereby creating perceptually-uniform cylindrical color space (PUCCS) coordinates for each of said NPU colors,
e) replacing said lightness coordinates for each of said PUCCS coordinates with a constant lightness value that is approximately one half of a maximum lightness value of a reference color volume;
f) replacing said chroma coordinates for each of said PUCCS coordinates with a constant chroma value, thereby creating constrained input colors,
g) wherein said constant chroma value is sufficiently low that said constrained input colors are located inside a reference color volume;
h) representing said constrained input colors in said NPU color space, thereby creating constrained NPU input colors;
i) applying said converted hue shift values to said constrained NPU input colors based on said converted hue values, thereby creating second NPU color coordinates having a shifted hue attribute;
j) creating first perceptually-uniform (PU) color coordinates by representing said input color coordinates in the coordinates of a PU space, said PU space comprising a perceptually uniform color space indexed by a hue coordinate, h, together with at least one other coordinate;
k) creating second PU color coordinates by representing said second NPU color coordinates in the coordinates of said PU space;
l) creating third PU color coordinates by combining hue attributes of said second PU color coordinates together with other coordinates of said first PU color; and
m) creating said output color coordinates by converting said third PU color coordinates to said output color space.

17. A method as described in claim 16 further comprising:
a) expressing a set of initial hue coordinates as hue mapping colors represented in the coordinates of said NPU space;
b) creating PU hue mapping colors by representing said hue mapping colors in the coordinates of said PU space;
c) extracting hue coordinates of said PU hue mapping colors;
d) relating said extracted hue coordinates to corresponding initial hue coordinates, thereby creating a hue scale conversion lookup table; and
e) wherein said hue scale converting comprises the application of said hue scale conversion lookup table.

18. A method as described in claim 16 wherein said expressing the hue attributes of said input color coordinates comprises blending an achromatic color with said input color coordinates in a linear light color space.

19. A method as described in claim 16 wherein said applying a hue scale conversion process comprises blending an achromatic color with said hue mapping colors in a linear light color space.

20. A method as described in claim 16 further comprising replacing luminance-related attributes of said output color coordinates with corresponding luminance-related attributes of said input color coordinates.

* * * * *